No. 688,988. Patented Dec. 17, 1901.
A. H. DOTY.
JAR.
(Application filed Apr. 5, 1901.)
(No Model.)
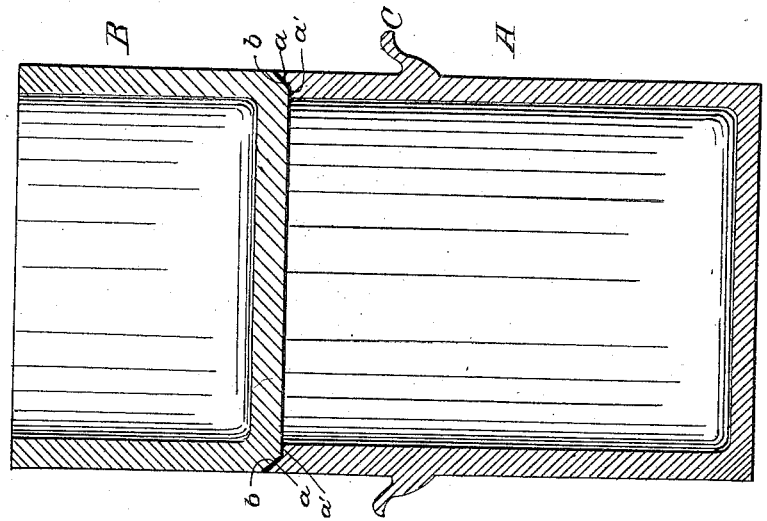
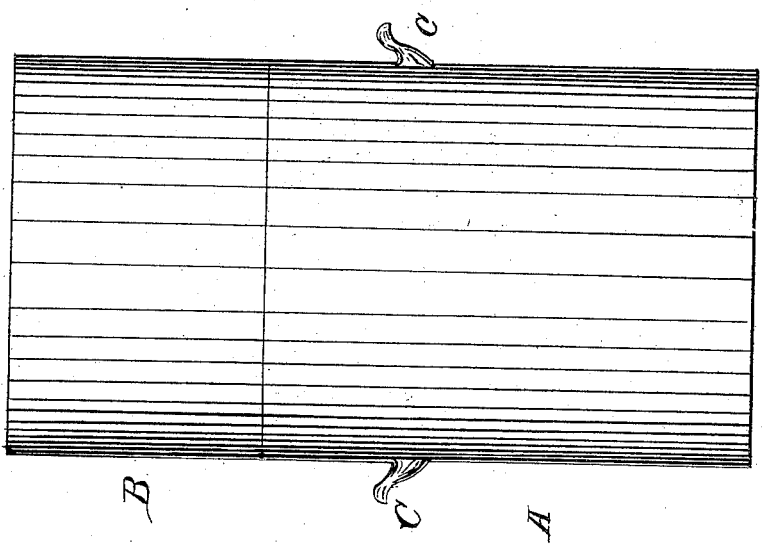
WITNESSES:
INVENTOR
Alphonso H. Doty
BY
Milo B. Stevens and Co.
ATTORNEYS.

UNITED STATES PATENT OFFICE.

ALPHONSO H. DOTY, OF OWATONNA, MINNESOTA.

JAR.

SPECIFICATION forming part of Letters Patent No. 688,988, dated December 17, 1901.

Application filed April 5, 1901. Serial No. 54,489. (No model.)

*To all whom it may concern:*

Be it known that I, ALPHONSO H. DOTY, a citizen of the United States, residing at Owatonna, in the county of Steele and State of Minnesota, have invented certain new and useful Improvements in Jars; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improvement in jars designed primarily for use in baking beans, but susceptible of other adaptations.

Heretofore in the art it has been found that in baking beans either in open jars or flat pans the heat of the oven is always more severe at the top of the beans, and it has therefore been necessary to exercise great care in the cooking of the same to prevent their being scorched or burned. It has also been found that the direct heat of the oven being applied to the beans is necessarily of a dry nature, and consequently what moisture the beans might contain will be quickly evaporated and the beans correspondingly dried when cooked.

It is the primary object of the present invention to construct an earthen jar of such a character as to prevent the direct heat coming in contact with the upper layer or layers of the beans and to also convert the dry heat of the oven into one of a moist character. From actual experience the accomplishment of this object has been found most beneficial.

The novel details in the arrangement and construction of the several parts of the jar will be apparent from the detailed description hereinafter and the appended claim when taken in connection with the accompanying drawings, forming part hereof and wherein a preferable embodiment of the invention is illustrated.

In the drawings like reference characters refer to corresponding parts in both views.

Figure 1 is an elevation of the complete device, and Fig. 2 is a vertical sectional view thereof.

Referring more specifically to the drawings, A designates the body or receptacle portion of the jar, which is made of any preferable or suitable earthenware capable of withstanding intense heat.

B is a cover-section of the jar, formed of similar material, but in itself constituting a receptacle for purposes to be hereinafter pointed out. The outer under edge of the cover is beleled and inclined inwardly, as shown at *b*, and is adapted to fit upon the correspondingly-inclined edge *a* at the upper outer edge of the jar proper. This peculiar joint will enable the top to wedge down upon the body of the jar, so as to form a practically air-tight joint, and to prevent the excessive downward movement of the top to such a degree as to split the jar the straight or shoulder portion *a'* at the base of the inclination *a* is provided. Both the receptacle A and the cover B are provided with integral oppositely-disposed handles C. The cover, as stated, is in itself a receptacle open at its top and is designed to receive water.

In use the beans are placed in the receptacle A with the cover wedged to the top thereof and then filled with water. The water in the top will effectually prevent the direct heat coming in contact with the beans at the upper portion of the receptacle and will prevent any danger of scorching the same, so that the beans throughout the whole of the jar will be subjected to uniform cooking or baking. The water in the receptacle evaporating will convert the ordinary dry heat of the oven into a moist heat, and this has been found to be an important factor, inasmuch as the beans under such circumstances retain just sufficient moisture to attain the most satisfactory results.

Having thus described the invention, what is claimed as new, and desired to be secured by Letters Patent, is—

An earthen jar for cooking beans, &c., and adapted to be placed in an oven, said jar comprising a receptacle for the articles to be cooked, and a removable cover for said receptacle, said cover having the form of an open-top receptacle adapted to receive water.

In testimony whereof I affix my signature in presence of two witnesses.

ALPHONSO H. DOTY.

Witnesses:
W. A. SPERRY,
D. M. EGGLESTON.